(12) United States Patent
Morita et al.

(10) Patent No.: US 7,079,948 B2
(45) Date of Patent: Jul. 18, 2006

(54) NAVIGATION APPARATUS AND DISPLAY METHOD THEREOF

(75) Inventors: Hiroyuki Morita, Saitama (JP); Shinichi Kawada, Niigata (JP); Eiichi Murohashi, Niigata (JP)

(73) Assignees: Nippon Seiki Co., Ltd., Niigata (JP); Honda Giken Kogyo Co., Ltd., Tokyo (JP)

(*) Notice: Subject to any disclaimer, the term of this patent is extended or adjusted under 35 U.S.C. 154(b) by 322 days.

(21) Appl. No.: 10/474,822

(22) PCT Filed: Dec. 9, 2002

(86) PCT No.: PCT/JP02/12869

§ 371 (c)(1),
(2), (4) Date: Oct. 15, 2003

(87) PCT Pub. No.: WO03/056277

PCT Pub. Date: Jul. 10, 2003

(65) Prior Publication Data
US 2004/0148101 A1    Jul. 29, 2004

(30) Foreign Application Priority Data
Dec. 26, 2001  (JP) .............................. 2001-395089

(51) Int. Cl.
*G01C 21/30* (2006.01)
(52) U.S. Cl. .................... 701/211; 701/200; 701/207
(58) Field of Classification Search ................ 701/200, 701/201, 207, 208, 209, 210, 211, 212, 213; 340/988, 990, 995.1, 995.14, 995.19, 995.2, 340/995.24; 342/357.01
See application file for complete search history.

(56) References Cited

U.S. PATENT DOCUMENTS

| | | | | |
|---|---|---|---|---|
| 4,513,378 A | * | 4/1985 | Antkowiak | 701/217 |
| 5,796,613 A | * | 8/1998 | Kato et al. | 701/214 |
| 6,006,161 A | * | 12/1999 | Katou | 701/212 |
| 6,067,521 A | * | 5/2000 | Ishii et al. | 704/275 |
| 6,088,652 A | * | 7/2000 | Abe | 701/208 |
| 6,253,174 B1 | * | 6/2001 | Ishii et al. | 704/231 |

FOREIGN PATENT DOCUMENTS

| | | |
|---|---|---|
| JP | 09-134123 | 5/1997 |
| JP | 10-20776 | 1/1998 |
| JP | 10-122875 | 5/1998 |
| JP | 10-332398 | 12/1998 |
| JP | 11-24556 | 1/1999 |

* cited by examiner

*Primary Examiner*—Richard M. Camby
(74) *Attorney, Agent, or Firm*—McDermott Will & Emery LLP

(57) ABSTRACT

A navigation system for displaying the information on at least the situations of a user in the screen x of a display unit. The entirety of the screen X can be so switched that a plurality of display modes may be automatically displayed at a suitable timing by the setting of the user. The navigation system has a menu mode for making the aforementioned setting, in which thumbnails T1 to T5 for reducing and displaying the individual designs of the display modes other than the menu mode are displayed in the screen X.

6 Claims, 3 Drawing Sheets

NAVIGATION APPARATUS AND DISPLAY METHOD THEREOF

TECHNICAL FIELD

The present invention relates to a navigation system to be utilized for guiding a mover such as a human being or a vehicle and a display method of the navigation system.

BACKGROUND ART

The navigation system to be utilized for the route guide of the mover such as the human being or the vehicle by displaying information on at least the current place of a user is practiced such that pieces of information such as a symbol indicating the current place (i.e., the aforementioned "information on the current place"), a route to be followed, a destination, an azimuth or a scale are overlapped and displayed on a map. The display mode includes a current place centralized display mode, in which the current place is arranged generally at the center of the display unit, and a front-wide display mode for displaying the front in the traveling direction widely. In each of the modes, moreover, it is known that the display is made by combining a-north-up display mode, in which the azimuth "north" is displayed up, or a heading-up display mode in which the traveling direction is displayed up (as referred to JP-A-10-20776, for example).

The display modes to be displayed in the screen of the display unit are of a fixed type of a predetermined design, of a switching type, in which a plurality of designs are automatically switched by the programs of the navigation system, or of an option type, in which a plurality of designs are selected at a suitable timing by the operation of the user. However: the fixed type has a problem of lack of fan; the switching type has a problem that the favor of the user is not reflected; and the option type has a problem that the operation is troublesomely required for each option. Thus, there is room for improvement in conveniences.

This navigation system has been conceived noting those problems, and the object is to provide a navigation system having improved conveniences, and a display method of the system.

DISCLOSURE OF THE INVENTION

As set forth in Claim 1, a navigation system of the present invention is characterized by comprising: position detecting means for detecting the situations of a user; display data creating means for creating display data for the basis of information to be displayed in a display unit; storage means for storing a plurality of display modes, in which the information is displayed in the display unit with different designs based on the display data; input means for setting the storage means with the display modes to be displayed in the display unit in accordance with the situations; and control means for switching and controlling the screen of the display unit so that any of the display modes may be automatically selected and displayed at a suitable timing in accordance with the situations.

According to the invention as set forth in Claim 1, the screen is automatically switched at a suitable timing to a design according to the favor of the user so that it is possible to provide a navigation system having the improved conveniences.

Especially in Claim 1, as set forth, in Claim 2, the navigation system is characterized in that the display modes have a menu mode for making the settings.

Especially in Claim 2, as set forth in Claim 3, the navigation system is characterized in that the storage means stores thumbnails displayed in the screen in the menu mode for reducing and displaying the individual designs of the display modes other than the menu mode.

According to the invention as set forth in Claim 2 or 3, the setting can be made while observing the menu mode, and especially, the actual display of the screen can be intuitively imagined with the thumbnails, so that it is possible to provide a navigation system having the better improved conveniences.

As set forth in Claim 4, there is provided a display method of a navigation system of the present invention for displaying the information on at least the situations of a user in the screen of a display unit. The display method is characterized in that the screen can be so switched that any of a plurality of display modes may be automatically selected and displayed at a suitable timing by the setting of the user.

According to the invention as set forth in Claim 4, the user sets the display mode to be displayed in the screen of the display unit so that the screen can be automatically switched at the suitable timing with a design according to the favor of the user. Therefore, it is possible to provide a display method of a navigation system having the improved conveniences.

Especially in Claim 4, as set forth in Claim 5, the navigation system is characterized in that a menu mode for making the setting is displayed in the screen.

Especially in Claim 5, as set forth in Claim 6, the navigation system is characterized in that, in the menu mode, thumbnails for reducing and displaying the individual designs of the display modes other than the menu mode are displayed in the screen.

According to the invention as set forth in Claim 5 or 6, the setting can be made while observing the menu mode, and especially, the actual display of the screen can be intuitively imagined with the thumbnails, so that it is possible to provide a navigation system having the better improved conveniences.

BEST MORE FOR CARRYING OUT THE INVENTION

The present invention will be described in connection with an embodiment shown in the accompanying drawings.

Figure 1:
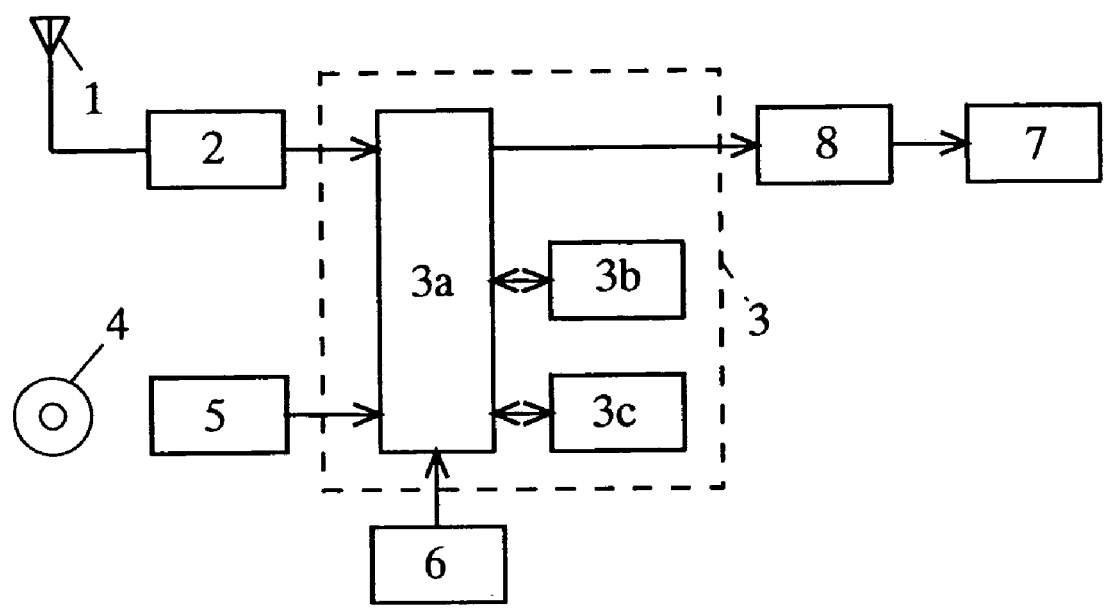
FIG. 1 is block diagram for explaining a navigation system.

FIG. 1 is a block diagram for explaining a construction of the embodiment of the present invention. This embodiment is constructed of: an antenna 1 for receiving signals from a positioning satellite for the GPS; a receiver unit 2 for fetching those signals for a predetermined period, to modulate/demodulate their frequencies thereby to operate and output positional data such as the latitude, longitude, traveling direction (as also called azimuth or angle) and altitude of the position of reception; a control unit 3 for determining positional data on the current place of a mover or user by inputting and operating the output signals from the receiver unit 2; a read unit 5 for reading display data around the current place and on map data such as maps, topographic maps, roads, rivers and place names, in accordance with the positional data of the control unit from a storage medium 4 such as a CD-ROM storing those map data; an input unit 6 such as a keyboard or switches operated by the user to input various settings to the control unit 3; and a display unit 7 made of an LCD for displaying pieces of information such as a current place, a destination, a route to be followed, an azimuth or a scale by using the display data based on the positional data of the control unit 3. 8 is a driver circuit for driving the display unit 7, located between the control unit 3 and the display unit 7.

In the so-called "GPS type" navigation system to be disclosed in this embodiment, the antenna 1, the receiver unit 2 and the control unit 3 make position detecting means for detecting the situations of the current place or the like of the user. In either the so-called "self-contained navigation type" navigation system or the so-called "hybrid type" navigation system using the second-contained type and the GPS together, however, various sensors such as a velocity sensor and an azimuth sensor, and an operation unit such as a microcomputer for the operations. The actions of the operation unit can be alternatively done by a CPU 3a of the control unit 3.

The control unit 3 is constructed of the well-known microcomputer (or micom), which is composed of the CPU 3a, a ROM 3b and a RAM 3c and so on. On the basis of programs stored in advance in the ROM 3b, the CPU 3a performs predetermined operations on the various data stored in the RAM 3c, to determine the positional data.

Here, in the construction that either the map data (or the display data) stored in the CD-ROM or DVD-ROM are fetched or from an external unit such as a personal computer or the map data (or the display data) are down-loaded from a remote server through communication lines, and are stored in a storage element (i.e., a mobile semiconductor element, as called "flash memory", "memory stick" or "memory IC"), that storage element corresponds to the storage medium 4. In this construction, the CPU 3a of the control unit 3 plays the role of the read unit 5, and the storage medium 4 and the read unit 5, or their alternatives make display data creating means for creating the display data to be displayed in the display unit 7 and providing a basis for the information to be described hereinafter.

Next, specific displays in the display unit 7 will be described with reference to FIG. 2 to FIG. 4.

Figure 2:
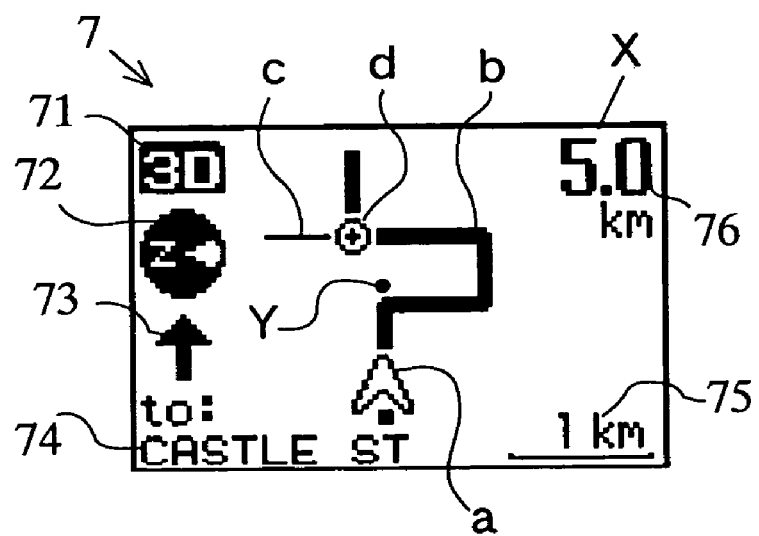
FIG. 2 to FIG. 4 are explanatory views for explaining displays in the navigation system.

FIG. 2 shows a display example called the "route guiding mode". The display device 7 has a screen X or a transversely long rectangular display area. This screen X displays various pieces of information. These pieces of information are constructed by combining data, which are extracted from the data extracted from the display data and the various data stored in the RAM 3c. The pieces of information are exemplified by: a current place indicating icon a of a general arrow shape for indicating the current place of the user; a used road image b of thick lines for indicating a road being followed by the user; an option road image c of a thin line for indicating an option road connected to the used road and located in front of the current place in the traveling direction; and a way point indicating icon d of a circle shape indicating an intersection between the used road and the option road, for example, as set by the user and located in front of the current place in the traveling direction.

The way point is used as a mark point such as the destination or a check point. Moreover, the traveling direction covers not only the forward direction during an actual movement but also the direction in which the user faces at an unmoving time.

The current place indicating icon a is displayed in the so-called "front-wide display mode" and in the "heading-up display mode". In these display modes, the current place indicating icon a is so positioned at a portion below the vertical center of the screen, e.g., at a one-third upper portion from the lower end of the screen X in the vertical direction that it may be positioned slightly below the center Y of the screen X. At the same time, the front in the traveling direction is displayed above the current place indicating icon a, and this current place indicating icon a does not change at its location or in its direction in the screen X but stands still at the portion even if the current place changes, until at least the way point indicating icon d is displayed in the screen X. Here in FIG. 2, the current place indicating icon a is displayed to take a position generally at a transversely intermediate portion of the screen X but may be displayed with a leftward or rightward shift depending upon the later-described relation to other display items.

The used road image b is displayed substantially all over the screen X, and the current place display icon a is displayed over that used road image b. The used road, as meant by this display, implies the road which is selected as a travel-planned route, as retrieved and set in advance with a route guiding function or the like by the user, from the starting place to the destination.

The option road image c is so displayed thinner than the used road image b as may take a display shape different from the used road image b. The option road image c is not displayed in the screen X, not only in case it does not exist within a predetermined range displayed in the screen X in front of the current place in the traveling direction, but also in case it exists at the back of the current place in the traveling direction.

The way point display icon d is not displayed not only in the screen X in case it does not exist within a predetermined range displayed in the screen X in front of the current place in the traveling direction, but also in case it exists at the back of the current place in the traveling direction. Moreover, the way point display icon d is not essential for the pieces of information. It is possible to select whether or not the way point display icon d is displayed, and it is arbitrary to leave the icon d undisplayed.

In addition to the pieces of information, the other display items are simultaneously or selectively displayed in the screen X, such as a satellite receiving situation 71, a traveling direction (or compass) 72, a travel guide 73, a current place name 74, a distance scale (or scale) 75 and a residual distance 76 to the next one of the way points.

By this display mode, the current place display icon a is displayed while standing still at the identical place without changing in the position or direction in accordance with the change in the current place, so that the current place display icon a in the screen X can be easily recognized to improve the visibility. When the actual surrounding landscape and the screen X are compared, the point of arrival of the current place in-the near future can be easily estimated.

Figure 3:
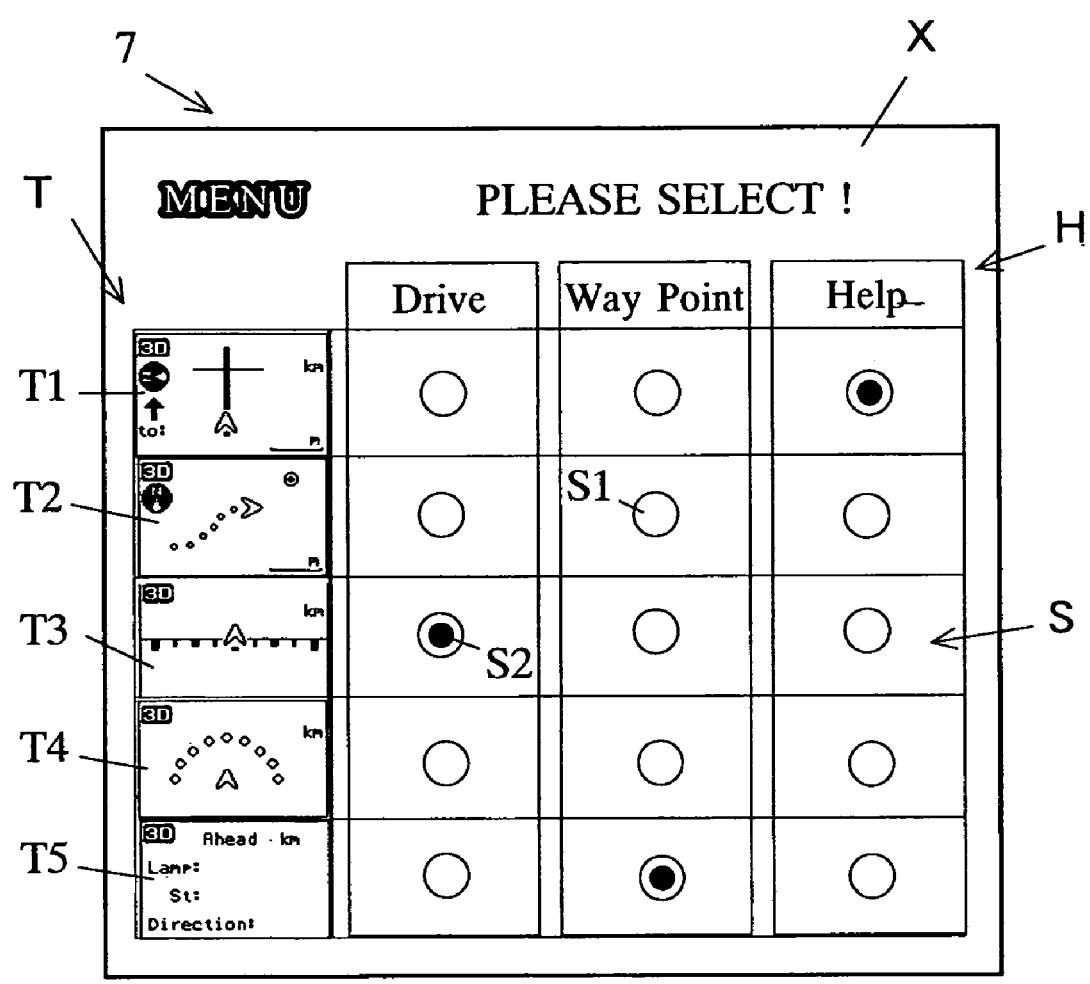
Figure 4:
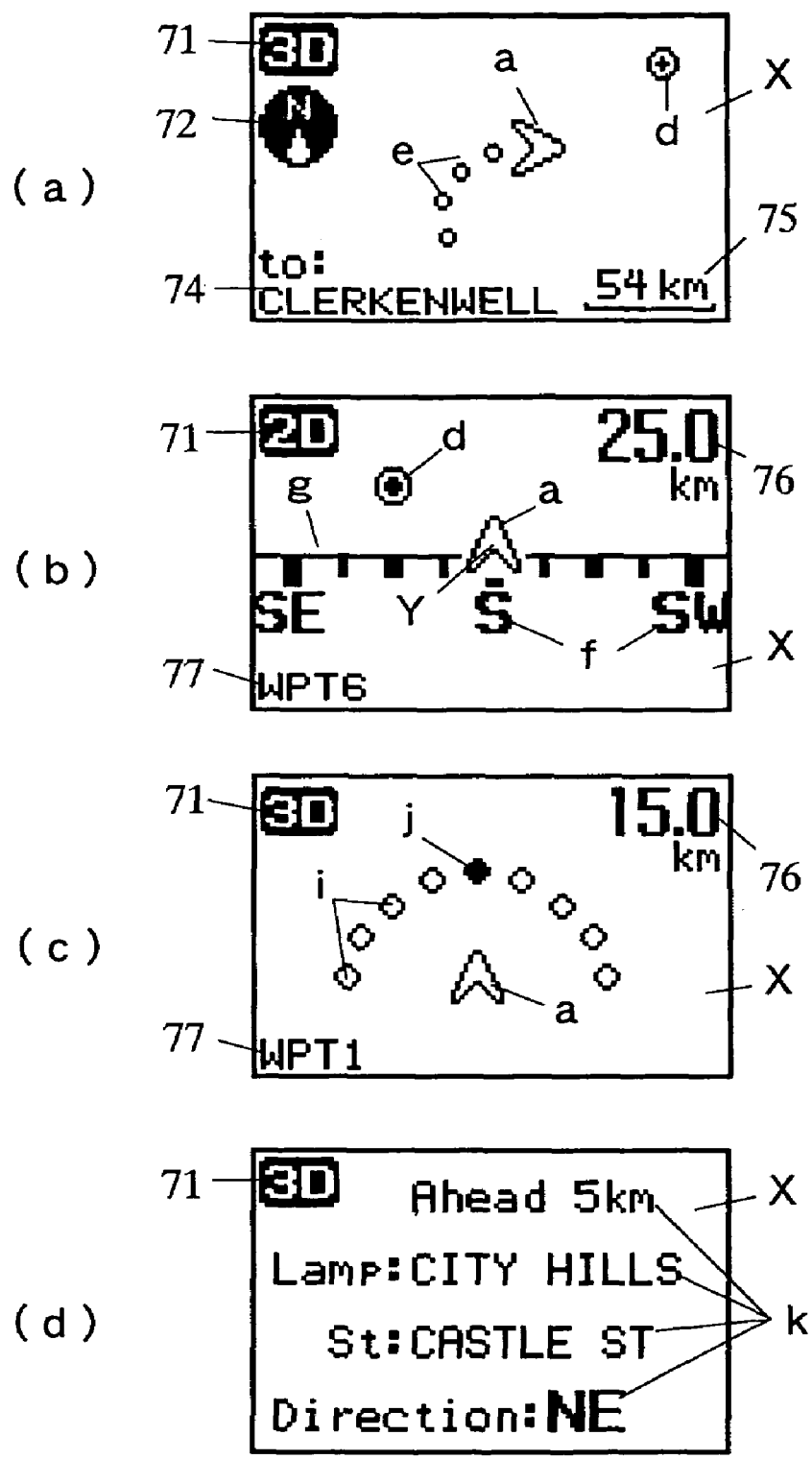

Here, the navigation system of the present invention has a display mode called the "menu mode", as shown in FIG. 3. In this "menu mode", as the information: a display sample portion T, in which thumbnails T1 to T5 or the reduced images of the individual designs capable of being changed and displayed in the screen X are arranged, is displayed in the vertical direction on the left-hand side of the screen X; a heading portion H, in which the situations of the user are arranged, is displayed in the transverse direction on the upper side of the screen X; and a select portion S composed of a plurality of radio buttons S1 is arranged at portions where the display sample portion T and the heading portion H intersect.

Specifically, the thumbnails T1 to T5 correspond not only to the aforementioned "route guiding mode" but also to the individual display modes called the "locus mode", the "compass mode", the "arrow mode" and the "letter mode", as will be described hereinafter. For each of the situations displayed in the heading portion H, the user is enabled, by setting any of the display mode to be displayed in the display unit 7 at the select portion S, to switch the screen X to a design according to the favor of the user, automatically at a suitable timing.

The thumbnail T1 displays the design of the "route guiding mode" in a reduced scale. When this "route guiding mode" is selected, the screen X of the display unit 7 makes a display with the design shown in FIG. 2, the description of which is omitted because it has been described hereinbefore.

The thumbnail T2 displays the design of the "locus mode" in a reduced scale. When this "locus mode" is selected, the screen X of the display unit 7 makes a display with the design shown in FIG. 4(*a*). Specifically, the current place indicating icon a, the way point indicating icon d and the history of the current place, i.e., the dotted locus image e indicating the points of passage of past travel are displayed as the information at the central portion of the screen X.

In this display mode, the information displayed in the screen X decreases to raise the visibility.

The thumbnail T3 displays the design of the "compass mode". When this "compass mode" is selected, the screen X of the display unit 7 makes a display with the design shown in FIG. 4(*b*). Specifically, the current place indicating icon a staying at the predetermined position even if the current place of the user changes, the azimuth information on the azimuth within a predetermined range in front of the traveling direction around the current place, and the guide information on the azimuth of the traveling direction at the current place and the way point set by the user are displayed as the information at the central portion of the common screen X.

The azimuth information is concerned with the azimuth within the predetermined range in front of the traveling direction around the current place. In FIG. 4(*b*), the azimuth within the range of clockwise and counter-clockwise 45 degrees in front of the traveling direction around the current place is composed of: symbols f of "N (north)", "NE (northeast)", "E (east)", "SE (southeast)", "S (south)", "SW (southwest)", "W (west)"and "NW (northwest)"; and a scale g dividing the whole azimuth (360 degrees) into 32 portions.

The guide information is concerned with the azimuth of the traveling direction at the current place and the way point. The way point indicating icon d forms, when displayed in the screen X, part of the guide information.

In case the traveling direction (or the front) is south and in case the way point is located south-southeast: the scale g is arranged in the horizontal direction generally at the center of the vertical direction of the screen X; the current place indicating icon a is located over that scale g and at the center Y in the screen X; the symbol f of "SE" and "SW" on the left-hand and right-hand sides below the scale g; the symbol f of "S" is displayed below the current place indicating icon a; and the way point indicating icon d is displayed intermediate of the symbol f of "S" and "SE" above the scale g. On the left-hand lower portion of the screen X, there is displayed a way point name 77 for specifying the way point.

In this display mode, the current place display icon a is displayed while standing still at the identical place without changing in the position or direction in accordance with the change in the current place, so that the current place display icon a in the screen X can be easily recognized to improve the visibility.

The thumbnail T4 reduces and displays the design of the "arrow mode". When this "arrow mode" is selected, the screen X of the display unit 7 makes a display with the design shown in FIG. 4(*c*). In the common screen X, specifically, the current place indicating icon a staying at the predetermined position even if the current place of the user changes, and the travel information on the direction of the way point (i.e., the way point direction), which is located around that current place indicating icon a and set by the user, are displayed as the information at the central portion of the screen X.

The travel information is composed of a plurality of breakpoint marks dividing the predetermined angle range at least in front of the traveling direction around the current place and capable of indicating the way point direction. In FIG. 4(*c*), the predetermined angle range is set to the leftward and rightward 90 degrees in front of the traveling direction around the current place and is divided by eight into nine breakpoint marks i, which are shaped into bright (or luminescent) dots arranged in islands. In short, the travel information is formed in the separate shapes.

Each of the breakpoint marks i has a region of leftward and rightward 11.25 degrees. In case the way point direction is contained in this region, the marks change into way point direction indicating and breakpoint marks j, which are shaped into dark (or unluminescent) dots and indicate the way point direction.

As a result, the relation between the traveling direction and the way point can be known at the unit of one quarter of 90 degrees.

By making the adjacent two of the breakpoint marks i into the way point direction indicating and breakpoint marks j, moreover, it is possible to indicate that the way point is located between those two marks j. In other words, a display mode like that of the divided indications at the unit of 11.25 degrees (i.e., one eighth of 90 degrees) can be realized to enhance the display resolution.

In this display mode, by observing the position of the way point direction indicating and breakpoint marks j, the relation between the traveling direction and the way point can be easily recognized to enhance the visibility.

The thumbnail T5 reduces and displays the design of the "letter mode". When this "letter mode" is selected, the screen X of the display unit 7 makes a display with the design shown in FIG. 4(*d*). Specifically, letters k such as the distance between the way point and the current place, the name of the way point, the name of the current place and the direction of the way point are displayed as the information at the central portion of the screen X.

In this display mode, the letters k are displayed in the screen X so that the situations can be instantly grasped to enhance the interpretation.

In this construction: the RAM 3*c* is used as storage means for storing the display modes for displaying the information in the display unit 7 with the different designs on the basis of the display data; the input unit 6 is used as input means for setting the display mode to be displayed in the display unit 7 according to the situations; and the CPU 3*a* of the control unit 3 is used as control means for switching and controlling the entirety of the screen X of the display unit 7 so as to select and display any of the display modes automatically at a suitable timing on the basis of the situations.

FIG. 3 shows the case, in which the display mode is set for each of the situations by the user, and shows the portion, at which a radio button S2 is selected by the user. Specifically, the entirety of the screen X of the display unit 7 is automatically switched such that: the display in the "compass mode" of the thumbnail T3 is made in the "Drive" indicating the moving time as the situations; the display in the "letter mode" of the thumbnail T5 is made in the "Way Point" indicating the approaching time of the way point within a predetermined distance as the situations; and the display in the "route guiding mode" of the thumbnail T1 is made in the "Help" indicating the unmoving time such as a stop as the situations.

According to this construction, the user is enabled, by setting the display mode to be displayed in the display unit 7 at the select portion S, to switch the screen X to a design according to the favor of the user, automatically at a suitable timing thereby to enhance the conveniences.

Moreover, the aforementioned settings can be made while observing the menu modes, especially, the thumbnails T1 to T5, the actual displays of the display modes in the screen X can be intuitively imagined to make the conveniences higher.

In the embodiment thus far described, moreover, the entirety of the screen X of the display unit 7 is switched so that the embodiment is suited for the display of the display unit 7 having the screen X of a small size. The navigation system having the improved visibility and conveniences can be realized while suppressing the cost for the display unit 7.

Here, the individual screens X of FIG. 2 and FIG. 4(a) to 4(d) and the screen X of FIG. 3 have different aspect ratios, but this difference is made just for conveniences of description. As a matter of fact, the switched displays are made in the identical screen X of the display unit 7.

The present invention should not be limited to the embodiment thus far described but can be modified in various manners.

In the foregoing embodiment moreover, the display modes need not be made different by switching the screen X for each of the situations. In addition, the input unit 6 can also be set to display the identical mode in all or some of the situations.

Moreover, the display items such as the satellite receiving situation 71, the compass 72, the travel guiding 73, the current place name 74, the scale 75, the residual distance 76 to the next way point, and the way point name 77 to be displayed in the screen X can be freely combined in the display modes, as shown in FIG. 2 and FIGS. 4(a) to 4(d), either by the instruction of the programs installed in the control unit 3 or by the selection by the user through the input unit 6.

The present invention should not be limited to the embodiment thus far described but can provide a display method of a navigation system for displaying the information on at least the situations of the user in the screen X of the display unit 7. By making it possible to switch the screen X such that any of the display modes may be automatically selected and displayed at the suitable timing by the aforementioned setting of the user, the display method of the navigation system, in which the screen X is automatically switched at the suitable timing with a design according to the favor of the user.

Especially, the menu mode for making the aforementioned setting is displayed in the screen X and, in the menu mode, the thumbnails T1 to T5 for reducing and displaying the individual designs of the display modes other than the menu mode are displayed in the screen X. Therefore, the aforementioned setting can be made while observing the menu mode. Especially, the display of the actual screen X can be intuitively imagined with the thumbnails T1 to T5, thereby to provide a display method of a navigation system having better improved conveniences.

INDUSTRIAL APPLICABILITY

The present invention is suitable for the navigation system to be utilized for guiding a mover such as a human being or a vehicle, and a display method of the system, and can provide a navigation system improved in conveniences and a display method of the system.

The invention claimed is:

1. A navigation system characterized by comprising:
   position detecting means for detecting the situations of a user;
   display data creating means for creating display data for the basis of information to be displayed in a display unit;
   storage means for storing a plurality of display modes, in which said information is displayed in said display unit with different designs based on said display data;
   input means for presetting said storage means with selected ones of the plurality of display modes to be displayed on a screen of said display unit at certain situations encountered during a route guidance; and
   control means for controlling the screen of said display unit to automatically switch, in response to encountering a respective certain situation during route guidance, to the display mode selected, via said presetting, to be displayed in response to said encountering said respective certain situation during route guidance.

2. A navigation system as set forth in claim 1, characterized in that said display modes have a menu mode for making said settings.

3. A navigation system as set forth in claim 2, characterized in that said storage means stores thumbnails displayed in said screen in said menu mode for reducing and displaying the individual designs of said display modes other than said menu mode.

4. A display method of a navigation system for displaying information on at least the situations of a user in a screen of a display unit, comprising:
   presetting selected ones of a plurality of display modes to be displayed on said screen of said display unit at certain situations encountered during a route guidance,
   automatically switching said screen, in response to encountering a respective certain situation during route guidance, to the display mode selected, via said presetting, to be displayed in response to said encountering said respective certain situation during route guidance.

5. A display method of a navigation system as set forth in claim 4, characterized in that a menu mode for making said presetting selected ones of said plurality of display modes is displayed in said screen.

6. A display method of navigation system as set forth in claim 5, characterized in that, in said menu mode, thumbnails for reducing and displaying the individual designs of said display modes other than said menu mode are displayed in said screen.

\* \* \* \* \*